(12) United States Patent
Martin

(10) Patent No.: US 9,424,579 B2
(45) Date of Patent: Aug. 23, 2016

(54) SYSTEM FOR GROUP SUPERVISION

(75) Inventor: David Martin, Natick, MA (US)

(73) Assignee: FMR LLC, Boston, MA (US)

(*) Notice: Subject to any disclaimer, the term of this patent is extended or adjusted under 35 U.S.C. 154(b) by 211 days.

(21) Appl. No.: 13/325,296

(22) Filed: Dec. 14, 2011

(65) Prior Publication Data

US 2012/0246222 A1 Sep. 27, 2012

Related U.S. Application Data

(60) Provisional application No. 61/466,098, filed on Mar. 22, 2011.

(51) Int. Cl.
*G06F 15/16* (2006.01)
*G06Q 30/00* (2012.01)

(52) U.S. Cl.
CPC .................................. *G06Q 30/00* (2013.01)

(58) Field of Classification Search
CPC ......... H04M 3/5175; H04M 2201/40; H04M 3/42221; H04M 3/5183; H04M 2201/42; H04M 2203/301; H04M 3/2281; G02B 27/017; G02B 2027/0187; G02B 2027/0138; G02B 2027/0178
USPC ................................................. 709/203, 224
See application file for complete search history.

(56) References Cited

U.S. PATENT DOCUMENTS

| | | |
|---|---|---|
| 4,970,666 A | 11/1990 | Welsh et al. |
| 5,397,133 A | 3/1995 | Penzias |
| 5,543,856 A | 8/1996 | Rosser et al. |
| 5,659,691 A | 8/1997 | Durward et al. |
| 5,802,284 A | 9/1998 | Karlton et al. |
| 5,912,700 A | 6/1999 | Honey et al. |
| 5,923,365 A | 7/1999 | Tamir et al. |
| 5,953,076 A | 9/1999 | Astle et al. |
| 6,073,115 A | 6/2000 | Marshall |
| 6,154,250 A | 11/2000 | Honey et al. |
| 6,266,100 B1 | 7/2001 | Gloudemans et al. |
| 6,289,380 B1 | 9/2001 | Battat et al. |
| 6,317,127 B1 | 11/2001 | Daily et al. |
| 6,380,933 B1 | 4/2002 | Sharir et al. |
| 6,449,010 B1 | 9/2002 | Tucker |

(Continued)

FOREIGN PATENT DOCUMENTS

| EP | WO2007/010416 | 1/2007 |
|---|---|---|
| WO | WO 2009/073978 | 6/2009 |

OTHER PUBLICATIONS

International Search and Written Opinion; PCT/US2012/029922; B.R. Copenheaver; Jun. 14, 2012; 15 pp.

(Continued)

*Primary Examiner* — Brian J Gillis
*Assistant Examiner* — Shean Tokuta
(74) *Attorney, Agent, or Firm* — Fish & Richardson P.C.

(57) ABSTRACT

A system includes one or more computer systems configured to receive a plurality of information streams from a corresponding plurality of client systems that have a defined geographic position, analyze the information feeds, generate messages based on the analysis of the information feeds, generate positional information associated with the messages, and generate a set of informational depictions of the generated messages, with the informational depictions of the messages when rendered on a display device are rendered in juxtaposition with representations of the client systems according to the generated positional information.

31 Claims, 9 Drawing Sheets

(56) References Cited

U.S. PATENT DOCUMENTS

| | | |
|---|---|---|
| 6,674,426 B1 | 1/2004 | McGee et al. |
| 6,744,436 B1 | 6/2004 | Chirieleison et al. |
| 6,803,928 B2 | 10/2004 | Bimber et al. |
| 7,053,916 B2 | 5/2006 | Kobayashi et al. |
| 7,064,742 B2 | 6/2006 | Navab et al. |
| 7,215,322 B2 | 5/2007 | Genc et al. |
| 7,337,325 B2 | 2/2008 | Ikegami et al. |
| 7,493,559 B1 | 2/2009 | Wolff et al. |
| 7,779,450 B2 | 8/2010 | Ohmori |
| 7,796,155 B1 | 9/2010 | Neely, III et al. |
| 2002/0031756 A1 | 3/2002 | Holtz et al. |
| 2002/0045988 A1* | 4/2002 | Yokota ............... 701/213 |
| 2002/0075282 A1 | 6/2002 | Vetterli et al. |
| 2002/0176000 A1 | 11/2002 | Katayama |
| 2002/0188943 A1 | 12/2002 | Freeman et al. |
| 2003/0012410 A1 | 1/2003 | Navab et al. |
| 2003/0051255 A1 | 3/2003 | Bulman et al. |
| 2003/0065766 A1* | 4/2003 | Parry ............... 709/224 |
| 2003/0086110 A1* | 5/2003 | Parry ............... 358/1.14 |
| 2004/0001106 A1 | 1/2004 | Deutscher et al. |
| 2004/0233200 A1 | 11/2004 | Karren |
| 2005/0261980 A1 | 11/2005 | Hadi |
| 2006/0256953 A1* | 11/2006 | Pulaski et al. ........... 379/265.06 |
| 2007/0132785 A1 | 6/2007 | Ebersole, Jr. et al. |
| 2007/0237491 A1 | 10/2007 | Kraft |
| 2007/0242131 A1* | 10/2007 | Sanz-Pastor et al. ..... 348/14.02 |
| 2008/0074494 A1 | 3/2008 | Nemethy et al. |
| 2008/0218331 A1 | 9/2008 | Baillot |
| 2009/0182499 A1* | 7/2009 | Bravo ............... 701/207 |
| 2010/0013739 A1* | 1/2010 | Sako et al. ............... 345/8 |
| 2010/0146608 A1 | 6/2010 | Batie et al. |
| 2010/0158237 A1* | 6/2010 | McCormack et al. ... 379/265.06 |
| 2011/0018903 A1 | 1/2011 | Lapstun et al. |
| 2012/0224020 A1* | 9/2012 | Portman et al. .......... 348/14.02 |
| 2013/0246053 A1* | 9/2013 | Scott et al. .................. 704/201 |

OTHER PUBLICATIONS

Dockstader, S.L., A.M. Tekalp, "Tracking Multiple Objects in the Presence of Articulated and Occluded Motion," Proceedings of the Workshop on Human Motion, Austin, TX Dec. 7-8, 2000, pp. 88-95.

Dockstader, S.I., A.M. Tekalp, "Multiple camera tracking of interacting and occluded human motion," Proceedings of the IEEE, Oct. 2001, pp. 1441-1455.

Gavrila, D.M., L.S. Davis, "3D model based tracking of humans in action: a multi-view approach," Proceedings CVPR '96: 1996 IEEE Computer Society Conference on Computer Vision and Pattern Recognition, Jun. 18-20, 1996, San Francisco, 1996.

Li, Z., H. Wang, "Real-Time 3D Motion Tracking with Known Geometric Models," Real Time Imaging 5, Academic Press 1999, pp. 167-187.

Rehg, J.M., T. Kanade, "Model-based tracking of self-occluding articulated objects, "Proceedings, Fifth International Conference on Computer Vision, IEEE Computer Society Press, Jun. 20-23, 1995, Cambridge, MA, 1995, pp. 612-617.

Mills, D.L., Network Time Protocol (Version 3), Network Working Group, Internet Engineering Task Group, Mar. 1992 (http://www.ntp.org).

Press release, "Yao Ming Basketball by Sorrent to be Distributed Exclusively via QUALCOMM's BREW Solution", QUALCOMM Incorporated, Apr. 29, 2003.

Press Release, "Sony Ericsson unveils the T606, a CDMA phone with state-of-the-art mobile entertainment and imaging features", Sony Ericsson, Mar. 4, 2003.

Yang, S-j, "SKT Launches New Technology in Incheon," The Korea Herald, Jan. 28, 2002.

Cavallaro, R., "The FoxTrak Hockey Puck Tracking System", IEEE Computer Graphics and Applications, Mar.-Apr. 1997, pp. 6-12.

SEC Form 10-K for Clear Channel Communications, Inc., Dec. 31, 2001.

Gueziec, A., "Tracking Pitches for Broadcast Television", Computer, Mar. 2002, pp. 38-43.

Heinzl, M., "Telecoms Hunt for Broadband 'Killer Apps' to use Nearly empty Data Delivery Pipes", The Wall Street Journal, Jun. 14, 2001.

Hindus, L.A., "CMOS: The Image of the Future", Advanced Imagining Magazine, May 2001, pp. 33-35.

Data sheet, "Kodak Digital Science KAC-1310 CMOS Image Season," Eastman Kodak Company, http://www.kodak.com/US/plugins/acrobat/en/digital/ccd/kac1310Long.pdf.

Kanade, T., et al., "Virtualized Reality: Digitizing a 3D Time-Varying Event As Is and in Real Time", Proceedings of the International Symposium on Mixed Reality (ISMR 99), Spriner-Verlag, Secaucus, NJ, 1999, pp. 41-57.

Longman, J., "Sports Use Technology and T.L.C. to Hold on to Fans", The New York Times, Jul. 31, 2001.

Pollefeys, M., "Self-Calibration and Metrix 3D Reconstruction from Uncalibrated Image Sequences", Ph.D. dissertation, Katholieke Universiteir Leuven Haverlee, Belgium, May 1999.

Tran, K.T.L., J. Angwin, "Sony, AOL Announce Agreement to Link PlayStation 2 to Internet", The Wall Street Journal, May 15, 2001.

Grenier, M.P., "Broadband User Growth Slows as Higher Costs Prove Obstacle", The Wall Street Journal, Dow Jones & Company, Oct. 18, 2001.

* cited by examiner

SYSTEM FOR GROUP SUPERVISION

This application claims priority under 35 U.S.C. §119 to U.S. Provisional Patent Application Ser. No. 61/466,098, filed Mar. 22, 2011, and entitled "Augmented Reality System for Group Supervision", the entire contents of which are hereby incorporated by reference.

BACKGROUND

This invention relates to tools that assist in supervision of call centers.

There are many situations that require group supervision. Examples include classrooms, seminars, etc. One particular example is a call center. Call centers are used by organizations to receive calls from, e.g., customers for various purposes such as to sell goods/services, answer questions, and/or provide information about a service. For example, call centers are used by mail-order catalog organizations, telemarketing companies, help desks, financial services firms and other large organizations as part of the manner such organizations provide services to customers or potential customers. Typically, a call center receives telephone calls from callers and routes the calls to customer service representatives that service the call. Generally, a call center has the ability to concurrently handle a large number of calls, to screen calls, to forward the calls to available representatives, and to log calls. Call centers can also involve text-based communications, such as interactive communications through a web browser or text messaging from a phone and the like.

SUMMARY

According to an aspect, a system includes one or more computer systems configured to receive a plurality of information streams from a corresponding plurality of client systems that have a defined geographic position, analyze the information feeds, generate messages based on the analysis of the information feeds, generate positional information associated with the messages and generate a set of informational depictions of the generated messages, with the informational depictions of the messages when rendered on a display device are rendered in juxtaposition with representations of the client systems according to the generated positional information.

According to an additional aspect, a computer program product tangible stored on a computer readable storage device comprising instructions to cause a processor to receive a plurality of independent information feeds from a corresponding plurality of client systems that have a defined geographic position, receive rules to analyze the information feeds, generate messages regarding the information feeds and generate a set of informational depictions of the generated messages, with the informational depictions of the messages when rendered on a display device are rendered in juxtaposition with representations of the client systems according to the generated positional information.

According to an additional aspect, a method includes receive a plurality of independent information feeds from a corresponding plurality of client systems that have a defined geographic position, receiving by the one or more computer systems rules to analyze the information feeds, generating by the one or more computer systems messages regarding the information feeds, and generating by the one or more computer systems generate a set of informational depictions of the generated messages, with the informational depictions of the messages when rendered on a display device are rendered in juxtaposition with representations of the client systems according to the generated positional information Additional features of the system include at least one of the information feeds comprising information specifying a physical location of the group of client systems. The system is further configured to generate an image as the representation of the client systems, the image augmented with the set of informational depictions of the generated messages in juxtaposition with the representations of the client systems in the image. The system is further configured to cause the informational depictions to be projected onto a display device. The system is further configured to cause the informational depictions to be projected onto a set of eyeglasses comprising a display device configured to receive the informational depictions. The system is further configured to generate the representations of the client systems and cause the informational depictions to be projected onto a set of eyeglasses comprising a display device configured to receive the informational depictions and the generated representation of the client systems.

The system further includes a portable computing system configured to receive the generated set of informational depictions and a set of eyeglasses comprising a display device, the display device configured to receive the generated set of informational depictions. The one or more computer systems are further configured to generate the image and an environment containing the group of client systems and generate the informational depictions as pictorial representations that depicted over corresponding client systems. The one or more computer systems are further configured to generate the pictorial representations and generate positional information in the image such that the pictorial representations are depicted over the client systems depicted in the image. The system further includes at least one image capture device, with the one or more computers, further configured to receive an image from the at least one image capture device to capture an image of a room with client systems. The one or more computer systems are further configured to receive a map of an area in which the group of client systems are located, analyze the received image to produce positional information regarding the group of client systems in the image. The one or more computer systems are further configured to receive a map of an area in which the group of client systems are located, analyze the received image to produce positional information regarding the group of client systems in the image and generate the informational depictions to be disposed over the representations in the image of those client systems in the group of client systems that are contained in the image at the time of generation of the image. The system further includes a set of devices positioned about an area containing the group of client systems, the devices configured to transmit signals into the area, a computer system configured to receive information from the set of devices, and determine the position of the display device relative to the group of client systems. The system one or more computer systems are further configured to receive positional information from the computer system, analyze the received positional information from the computer system to determine the relative position of the display with respect to the group of client systems located in the environment, and cause the one or more computers to position the informational depictions from over the depicted representations of those client systems in the group of client systems in the image. The system further includes an augmenting media device configured to receive the generated image. Analogous features are also included for the computer program product and the method.

DESCRIPTION OF DRAWINGS

The accompanied figures are to be used in conjunction with the description below.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
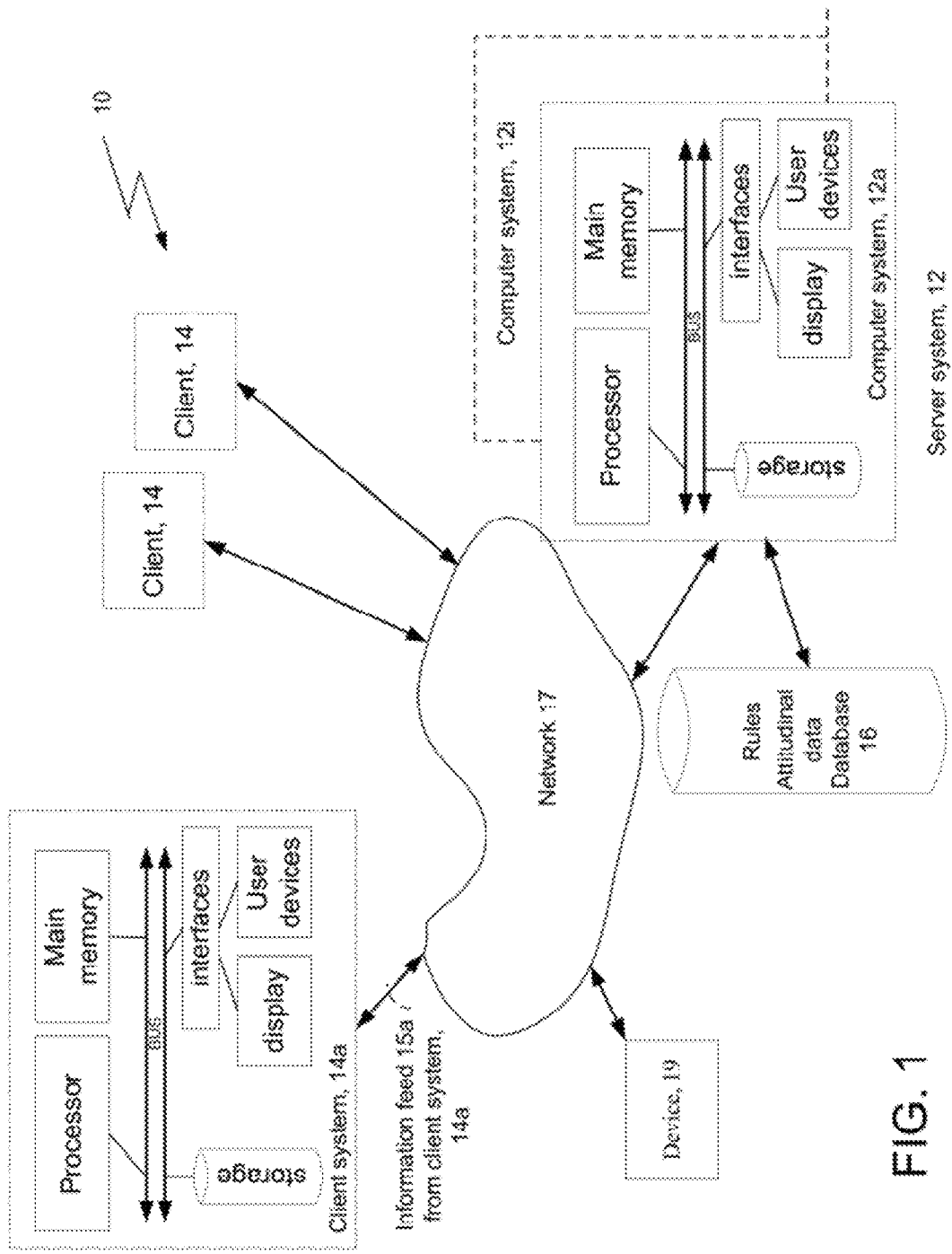
FIG. 1 is a block diagram

Referring now to FIG. 1, a system 10 includes a server type of system 12 comprised of one or more computer systems 12a-12i, each computer system 12a-12i including processor, memory and computer storage that stores a computer program product to augment an image with informational depictions. When executed, the computer program product configures the server 12 to receive a plurality of independent information feeds (one of which 15a is referenced in FIG. 1) or message streams from a plurality of client systems, generally 14. The information feeds are received over a network 17, which can be a wired or a wireless network. The computer program product executing on the server 12 receives rules from a database 16 or has rules embedded in the computer program product. The server 12 processes the independent information feeds and analyzes the independent information feeds based on the rules to ascertain information regarding the informational feeds.

For example, an application of the system 10 is in the context of supervising of a group of individuals that are dealing with customers, e.g., in a call center. Typically, customers will have contacted the call center via a telephone or via a text-based communication channel through a customer's computer system (not shown). Typically this communication is routed via a routing system (not shown) to a representative that is associated with one of a plurality of client systems as depicted in FIG. 1, e.g., client system 14a.

The system 10 monitors conversations provided through the communication channels, either by directly monitoring conversations that occur on the calls made into the call center or monitoring text-based conversations. Using client 14a as an example, while a conversation between a customer and representative associated with client system 14a progresses, an issue may arise that requires a supervisor's attention. This issue may not be recognized by either or both of the customer and representative and therefore, there may be no discernible indication to a supervisor that the conversation may require supervisor intervention.

System 10 includes a device 19 used to display informational depictions of generated messages for a supervisor, as discussed below. The device 19 can be any type of device capable of displaying information. Device 19 can be a display associated with a portable computer system, carried by the supervisor such as a tablet computer or a personal digital assistant or a set of virtual reality eyeglasses (or other type of augmenting media device) worn by the supervisor.

The system 10 receives various the informational feeds, such as informational feed 15a either directly from the client systems 14 or by other techniques (e.g., from a call switch not shown) and analyzes those feeds to ascertain a status of the communication and determine whether intervention is warranted. In an embodiment, the informational feed is actually a composite feed having two or more channels representing portions of a conversation of each participant.

That is, rather that aggregating each person's speech into a single conversation each person's speech is provided to the system 10 as a separate channel and the server applies speech to text on each channel. The system 10 analyzes the information feed 15a associated with client system 14a by processing the information feed through the set of rules. Typically, each channel of the information feed is analyzed separately. However, the channels could be aggregated and analyzed as a single channel.

Figure 2:
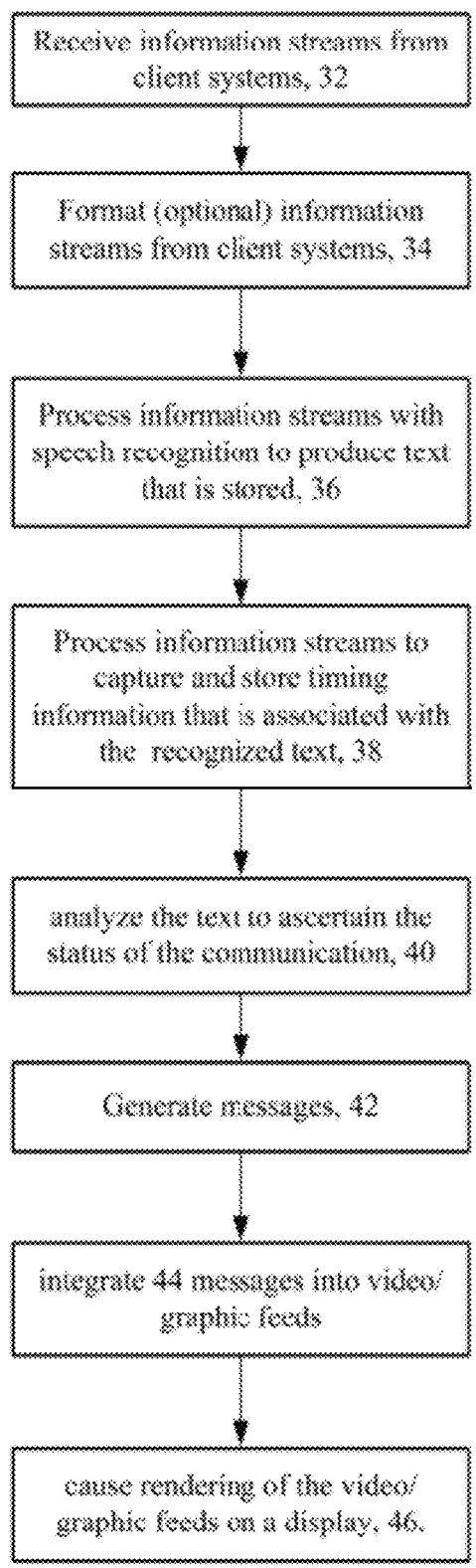
FIGS. 2-4 are flow diagrams.

Referring now to FIG. 2, the information stream 15a is received 32 and typically, prior to running through the set of rules various other processes are applied to the stream. For example, when the informational stream 15a is a monitored call from client system 14a, the information is typically formatted 34 to be in a particular format and is fed to speech recognition software 36 that produces a text representation (not shown) of the information feed 15a. Typically, this text representation is stored in a file or other storage structure in the database 16 or in the one or more computer systems 12a-12i, and is associated with the particular client station, here client system 14a.

Generally, speech to text recognition needs to be trained. For a customer representative, the speech to text recognition would be relatively accurate if the same database of speech (phoneme) to text is used for the particular representative each time. For the customer the recognition would be less accurate. When different channels of the speech are captured, different speech to text recognition processes are used on each channel, one process trained for the customer representative the other trained to generically cover a broad range of voices. Other configurations are possible.

In some embodiments, additional information from the conversation is captured. For example, timing information can be captured 38. This timing information could take various forms such as durations of one person speaking, duration of gaps between recognized speech, duration of periods of silence (gaps in speech), etc. or gaps in typing of the text in a text based communication (discussed below).

In some implementations, timing information can be ascertained for each recognized word in a communication and stored with the recognized text. The system 10 uses the speech recognition process to generate the timing information for the conversation during the monitored call. The system 10 using the speech recognition generates 38 a time mark (e.g., an indication of an elapsed time period from the start of the communication), recording an elapsed time for each word in a sequence of words in each channel of the communication that the speech recognition recognizes. The system 10 using the speech recognition generates the output file of each recognized word and the time it was recognized, relative to an initial time mark (e.g., the elapsed time). Each person's portion of the conversation is captured, organized and stored by attribution in the text file.

For a text-based communication, typically speech recognition is not needed. The text based communication, typically HTML or the like may be formatted, and stored as a text file. The HTML could be used directly. Each person's text based inputs are captured, organized and stored by attribution in the text file.

With either approach at this junction there is a text representation of the communication. The text representation is processed by tools that analyze 40 the text to ascertain the status of the communication between the customer and the representative. In some implementations, the determined timing information is analyzed as part of the analysis to determine the status of the communication. Analysis 40 is typically a continuous process. The analysis process 40 generates 42 messages regarding a status/nature of the conversation. The messages are integrated 44 into video/graphic feeds or the like as informational depictions for rendering on a display, as discussed below.

Figure 3:
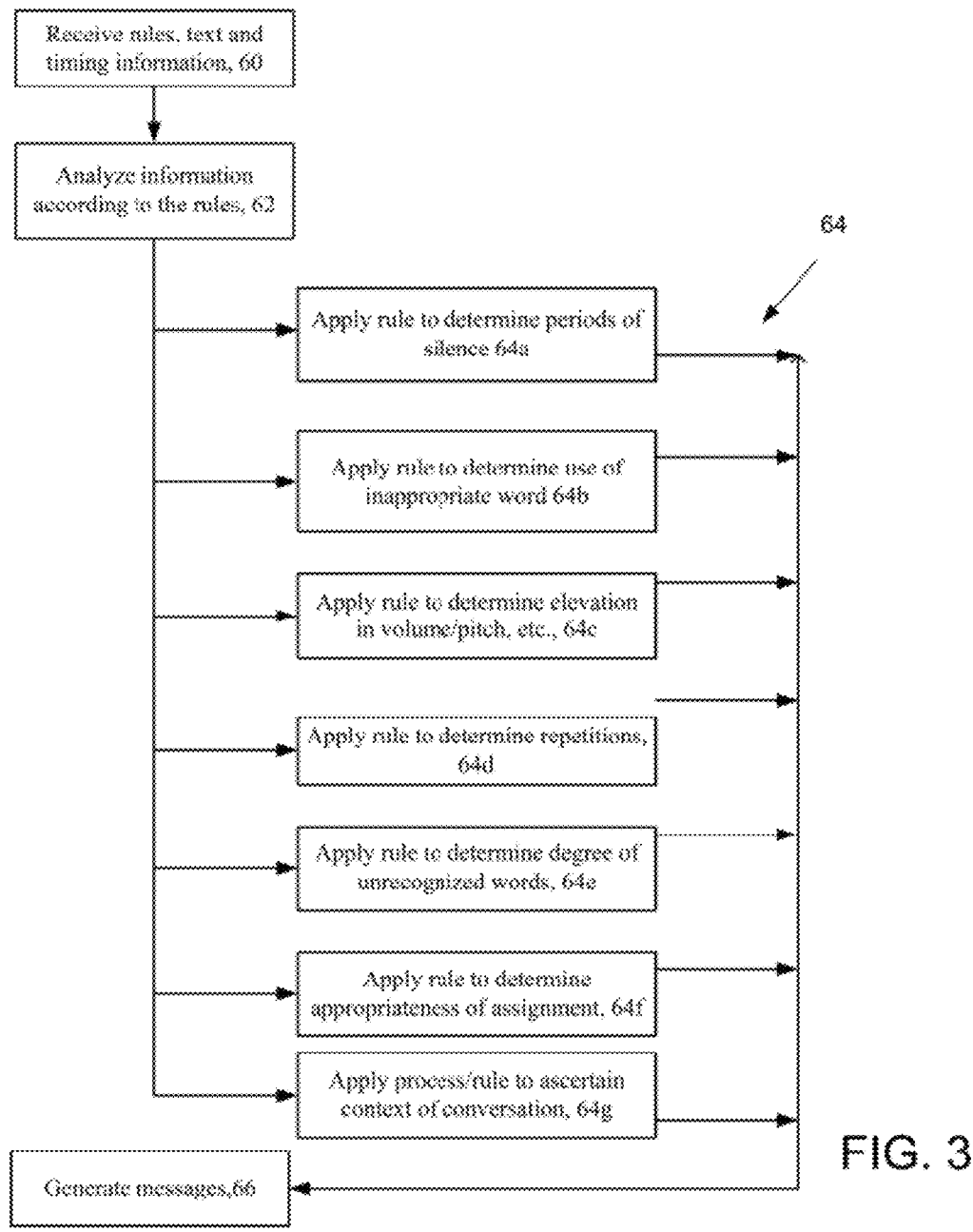

Referring now to FIG. 3, details of analysis 40 are depicted. A rules engine executing in the one or more computer systems 12a-12i of system 10 receives 60 rules, data and the text and timing information in the files that result from processing of the information stream, e.g., information stream 15a, here processed from two channels one for the customer the other the customer representative. The rules engine analyzes 62 the text and the timing information using user-defined rules that consider factors to determine a status of the conversation.

Examples of conditions that can be determined include the presence or absence of long periods of silence within the communication 64a, the use of inappropriate words 64b, elevations in the volume and/or pitch of one or both of the conversations 64c, repetitions of phrases 64d, a high degree of unrecognized words that may indicate customer and representative talking over each other 64e, and determining whether a customer has been appropriately assigned to a representative 64f. Appropriateness of an assignment of a customer to a representative can be based on various factors such as the importance of the customer, as measured by account balances or longevity of the customer with the organization or other measures vs. experience of the representative.

Various levels of sophistication in analysis can be applied by the rules. Relatively, simple rules, such as looking for the repetitions in phrases, length of call, periods of silence, nature of the subject matter as discussed above are used for a simple analysis. However, more sophisticated approaches could be used such as natural language processing to ascertain the meaning/context of the communication 64g.

The rules engine processes results of analyzing generally 64 and generates 66 a message or a series of messages. Various techniques can be used. For example for each of the rules thresholds can be established. Illustratively, long periods of silence within the communication rule 64a can have a threshold of for example X seconds between recognized words, where X is user-selectable typically 10 to 20 seconds max (although any duration can be specified). If this duration threshold is exceed once or a certain number of times over a period of time, (again user-selectable) an alert is generated that produces an appropriate message. In another example, a list of inappropriate words rule 64b is maintained. That is, the text in the text files list is continually compared against words in the list of inappropriate words, and if use of an inappropriate word is detected even once, (example of a zero tolerance threshold) an appropriate message is generated. Thresholds can be established for the other rules such as elevations in the volume and/or pitch rule 64c, repetitions of phrases rule 64d, a high degree of unrecognized words rule 64e.

Based on user-selectable/determinable combination of violations of these rules different types of messages are generated. For example, violation of rule 64b automatically generates an alert that results in a message to the supervisor that there could be a problem with the conversation at client system 14a, whereas for the other rules multiple ones of the rules exceeding the threshold or multiple times of a single rule exceeding a threshold could be used to trigger a message.

Typically messages are generated periodically, such as when analysis 64 detects a change in status of the communications, as mentioned above. Messages can be generated and displayed for all of the client systems 14 or for only those systems currently within a field of view of device 19. A default message can be generated when analysis indicates that there are not any detected problems with the conversation at client system 14a. Those client systems 14 that are not actively engaged in a conversation can also have messages generated that indicate that status.

The generated messages can be relatively simple such as data that when processed for display provides a simple visual indication that a problem may exist in the communication. Simple messages can be generated by the rules engine to produce data that when rendered, as discussed below provides informational depictions in different colors, e.g., red, yellow or green, which would correspond to different levels of status, e.g., problems, potential problems or no problems with the communication.

Complex messages can be generated. Such complex messages can include textual messages that convey information regarding the information feeds being analyzed. With complex messages, the informational depictions can include part of either one of the conversations from the communication or can include statements generated by the rules engine that summarizes the communications or statements are standard messages for particular conditions detected by the rules.

Figure 4:
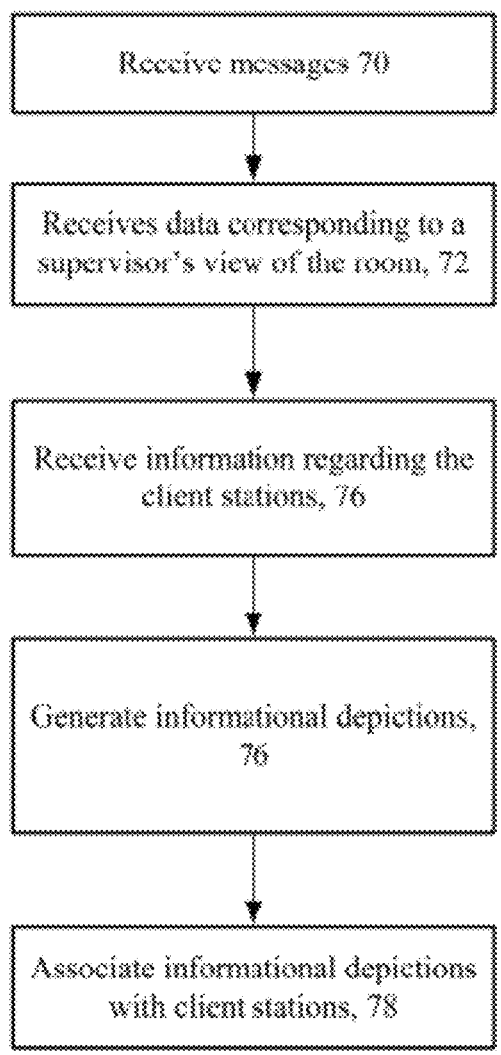

Referring to FIG. 4, the server 12 receives 70 the generated messages from the output of the rules engine and in some embodiments receives 72 data corresponding to a view of the environment, e.g., a room containing the group of client systems, as viewed by the supervisor. The server 12 also receives 74 information that specifies the physical location of each of the client systems 14. The server generates 76 informational depictions based on the received messages and associates 78 the generated informational depictions with corresponding client systems 14.

Figure 8:
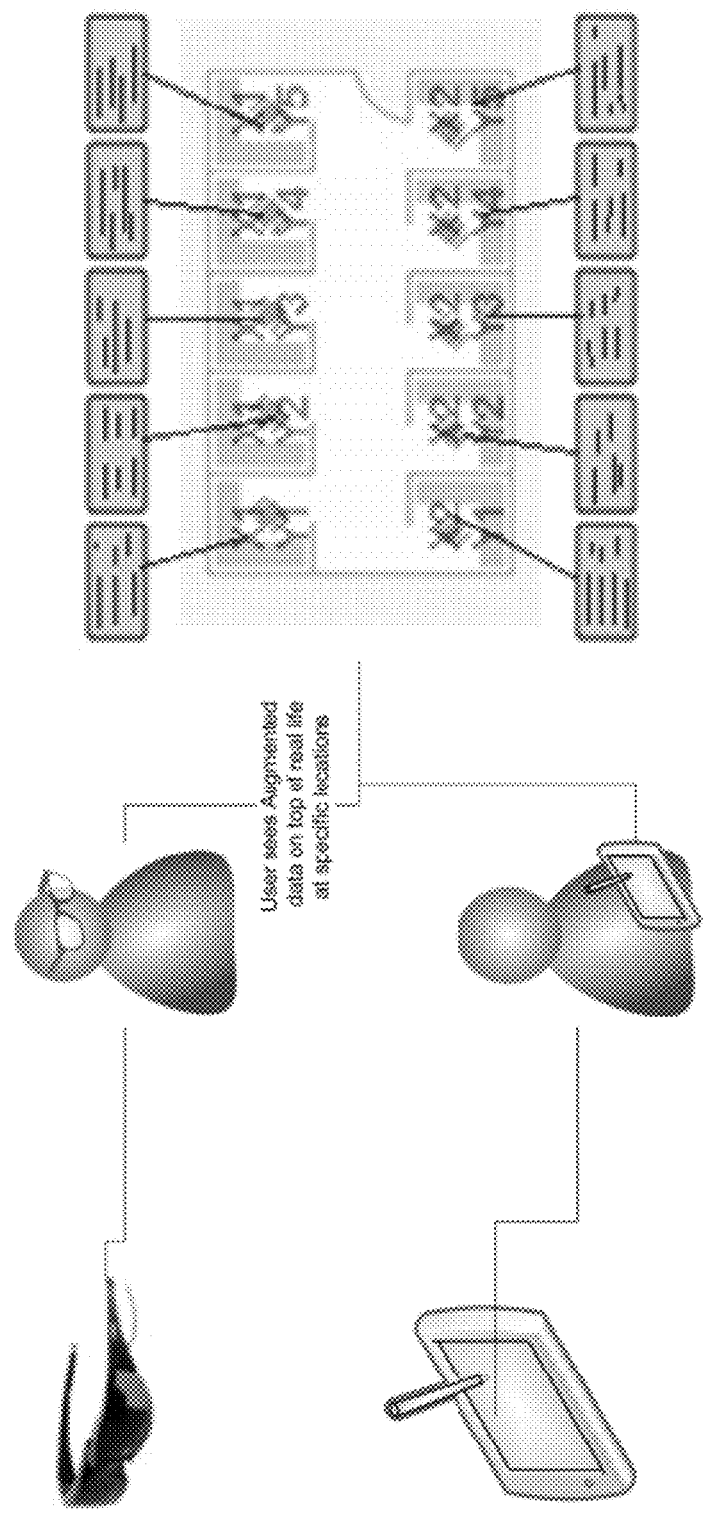
FIG. 8 is a pictorial depiction of a supervisor having various devices in a room containing a group of client systems.

In one embodiment of associating 78, the server 12 generates an image of representations of client systems in the group of client systems. The generated image can be a real-world image depicting the room with people at computers, or it can be a morphed or virtual depiction. The generated image is augmented with a set of informational depictions of the generated messages. The informational depictions of the generated messages are position in the generated image in juxtaposition, e.g., over the representations of the client systems in the image, for example, as illustrated in FIG. 8.

In another embodiment of associating 78, the server 12 rather than generating an image of representations of client systems in the group of client systems, the server 12 generates the informational depictions for the generated messages with positional information that when sent and rendered on a display device will depict the informational depictions projected onto a real-world view of the room of the client systems 14. That is, in these embodiments the real world view is provided from looking through a set of eyeglasses. This view is augmented with the set of informational depictions of the generated messages that are projected on screens of the glasses. The informational depictions of the generated messages are position in the generated image in juxtaposition, e.g., over the representations of the client systems in the image.

Exemplary eyeglasses are Wrap 920 VR Bundle from Vuzix Corporation 75 Town Centre Drive Rochester, N.Y. 14623. Such eyeglasses often referred to as video eyewear connects media players or video-out capable mobile phones or a laptop, netbook or desktop PC. Such eyewear typically includes a video eyewear a video e.g., VGA. Adapter and tracker. Other examples from Vuzix include The Wrap™ 920AR augmented reality eyewear. Other examples include Z800 Pro AR head mounted display (single or dual VGA input version.) standard or ruggedized distributed by CyberWorld, Inc. 60 De Bresoles Unit 202 Montreal, QC, Canada. In general such eyewear is a wearable display that presents a virtual large screen, stereo video capture, 6-degrees of freedom and head tracking.

Figure 5:
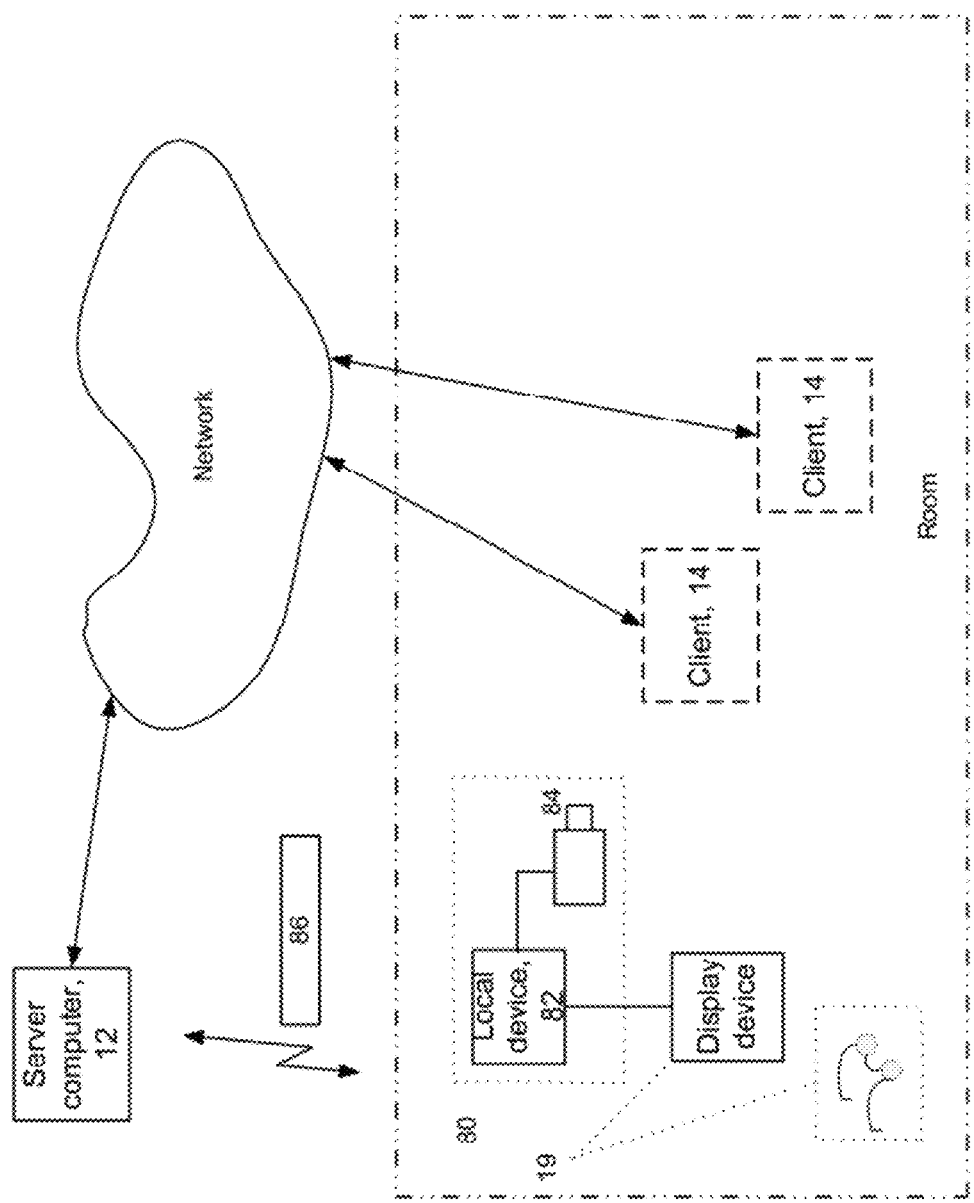
FIG. 5 is a block diagram.

Referring now to FIG. 5, a user, such as supervisor of the call center is outfitted with the device 19 (FIG. 1) that is configured to receive the generated augmentation and/or the generated, augmented image of the room. In one embodiment, the eyeglasses mentioned above are used as the device 19. The eyeglasses allow the supervisor to see through the glasses and observe the real world as a normal set of glasses. The eyeglasses are configured to receive the generated augmentation of the informational depictions and project the generated augmentation of the informational depictions onto the glasses such that the informational depictions are rendered in juxtaposition with corresponding ones of the client systems 14.

In another embodiment, a user, such as supervisor of the call center is outfitted with a portable computer system 80. The device 19 is the display portion of the portable computer system 80 that is carried by the supervisor. Examples include a tablet computer or a personal digital assistant. The system 80 includes a local computer 82 that processes an image of the scene received from, e.g., a camera 82 and applies the received augmentation to the generated image for rendering on display 84. Alternatively, the local computer 82 can receive the generated augmentation and the generated image from the server 12.

With the set of eyeglasses used as the display, the eyeglasses are configured to receive the generated image over a wireless or wired connection from either the local computer 82 or the server 12. The portable computing system 82 such as a personal digital assistant or a tablet computing device can be configured to receive the generated augmented image over a wireless connection.

The server 12 is further configured to generate the informational depictions of the generated messages as pictorial representations that have text corresponding to the message contained in the pictorial representations. Examples include balloon depictions, callouts, cartoons, simple text boxes, etc. The depictions can be generated in colors to indicate a level of severity as discussed above or merely be rendered in colors without any text. These generated messages are sent in a data stream 86 from the server 12 to the local device 82.

The server 12 is further configured to cause the informational depictions to be rendered over the client systems depicted in the image or the real-world actual view. In other embodiments, the system 10 has an image capture device 84 disposed in the room, either in a fixed position or attached to e.g., the computer 82 or otherwise stand-alone. From the image capture device 84 the computer 84 or sever 12 receives real-world, real time images the client systems 14 in the room. Alternatively, the image capture device 84 is mounted in or on the eyeglasses.

Figure 6:
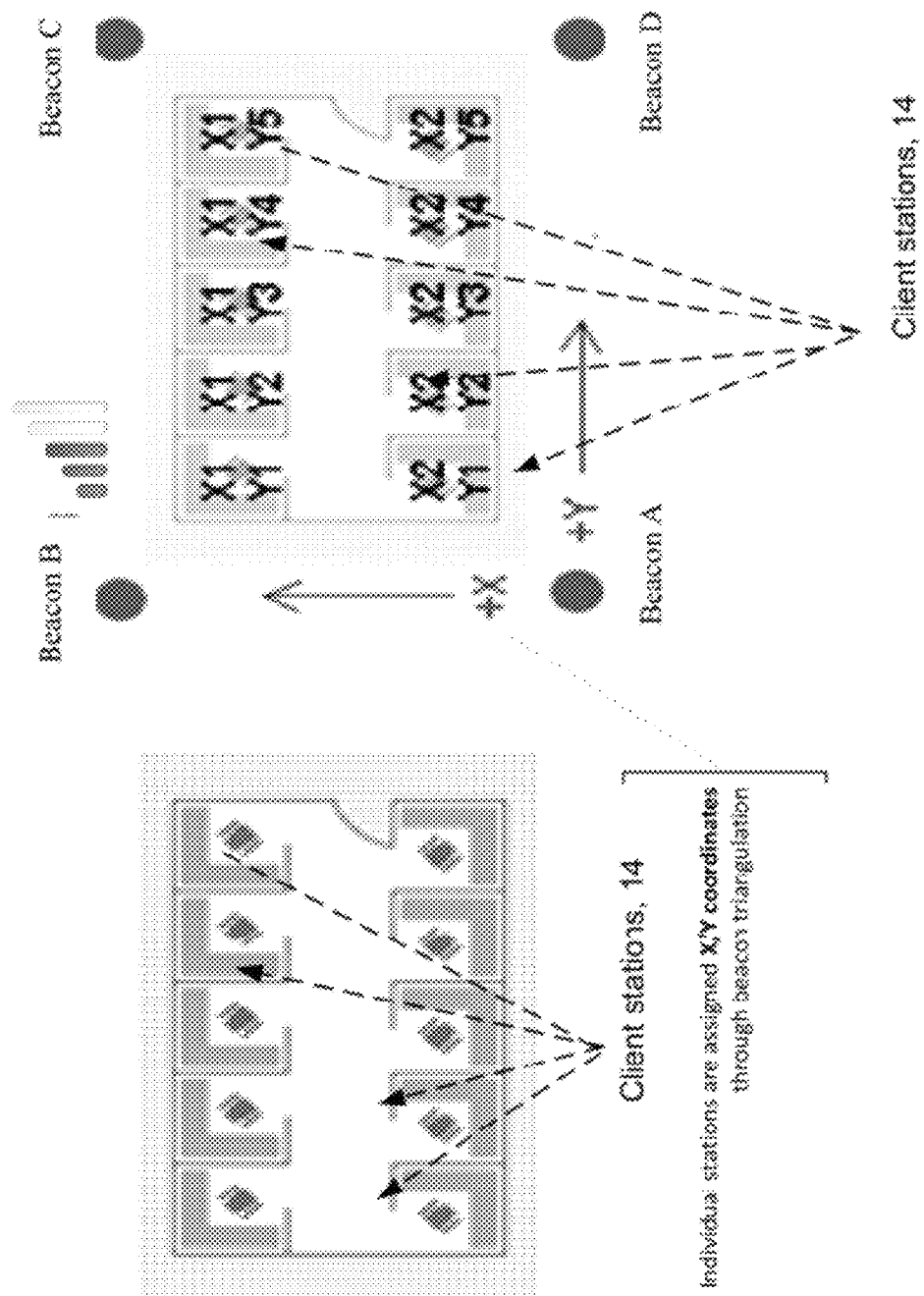
FIG. 6 is a pictorial depiction of a room containing a group of client systems and beacons.

Referring now to FIG. 6, positional information regarding each of the client systems 14 is provided to the server 12, as discussed below. Generally, the locations of the client systems 14 are fixed. In one embodiment, the client systems 14 contained in the image presented to the supervisor will constantly change depending on the location and orientation of the supervisor with respect to the client systems 14. For example, as the supervisor walks through the room different client systems 14 will come into and go out of the field of view in the image. It would be desirable therefore for the server 12 to also have information regarding which systems are currently in the field of view of the display carried by the supervisor, e.g., the eyeglasses. This can be accomplished by various techniques, discussed below.

Individual client systems 14 in a room are assigned X and Y coordinate positions so as to map the client systems 14 to a floor plan of the particular room. The room is outfitted with beacons e.g., beacons A-D. These beacons operate using optical or radio frequency or acoustic signals. The client systems 14 are assigned X and Y coordinate positions through a triangulation process. The positions for each client system are stored in the one or more computers of the system 10, as a map.

Figure 7:
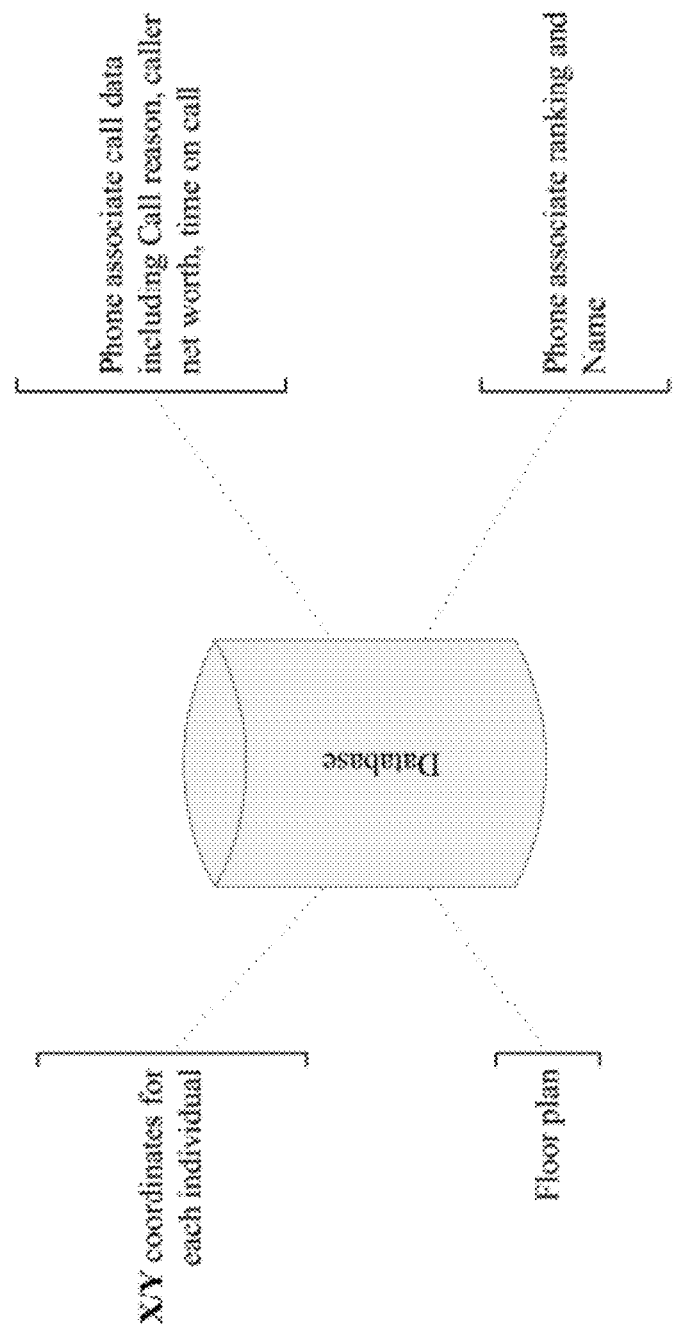
FIG. 7 is a block diagram of a representation of information used in the system of FIG. 1.

Referring now to FIG. 7, a depiction of the types of data/information stored in the database 16 is shown. These data include the X and Y coordinates for each individual client systems 14, phone associate call data including call reason, caller net worth, time on call, the floor plan of the room and phone associate ranking and name. In this embodiment all of the client stations are considered to be in the field of view of the supervisor and each station is associated with an informational depiction that is renders on the supervisor's portable device.

Referring to FIG. 8, a supervisor is outfitted with one of the portable stations mentioned above, e.g., the eyeglasses, local computer, tablet computer, etc. The portable station using signals from the beacons A-D (FIG. 6) determines through triangulation either the supervisor's position or the portable station's position (active or passive techniques can be used). The supervisor's position (or the portable station's position) is mapped into the map of the floor plan. The supervisor's position and orientation are determined relative to the X and Y coordinates of the locations of the client systems. This is accomplished by the server 12 comparing the supervisor's current position in the X and Y coordinates to the assigned/mapped X and Y coordinates of the client systems 14.

The server 12 uses the supervisor's position (that can change as the supervisor moves through the room) and the X and Y coordinates of the client systems 14 to generate the particular informational depictions for the client systems 14, which the server 12 deems to be in the current field of view of the supervisor. The server 12 determines which information depictions to generate based on the positional information for the client systems 14, as discussed above, and the positional information regarding the supervisor or the supervisor's system.

The server 12 is configured to use the map of the client systems 14 and the analysis of the received image to produce positional information regarding the group of client systems in the image and hence in a current view of the supervisor. That information is used to decide which informational depictions are used to augment the image and where in the image the informational depictions should be rendered with respect to the client systems 14 when the augmentation is displayed on the display device. The system 10 will cause the server 12 to position in the image, the informational depictions over the representations of those client systems in the group of client systems that are contained in the image at the time of generation of the image.

Generally, the server 12 will be constantly generating the messages from analyzing the various informational feeds and likewise constantly generating the informational depictions. The particular informational depictions that would be sent to the supervisor's portable station would be those corresponding to the client systems that are determined by the one or more computers to be in a current view of the supervisor according to the supervisor's current position. In some implementations, where the room is not very large or where a supervisor can have a view of the entire room with all client systems in the view, all of the generated informational depictions can be sent to the supervisor's portable station.

To determine orientation, a supervisor can signal the server 12 of the supervisor's current orientation either manually or automatically, e.g., by wearing an electronic compass that can send a signal back to the server 12 giving the supervisor's current orientation relative to the client systems 14 in the room. In other simpler implementations, the server 12 can assume that the supervisor is always facing in a set direction. Other arrangements are possible.

Figure 9:
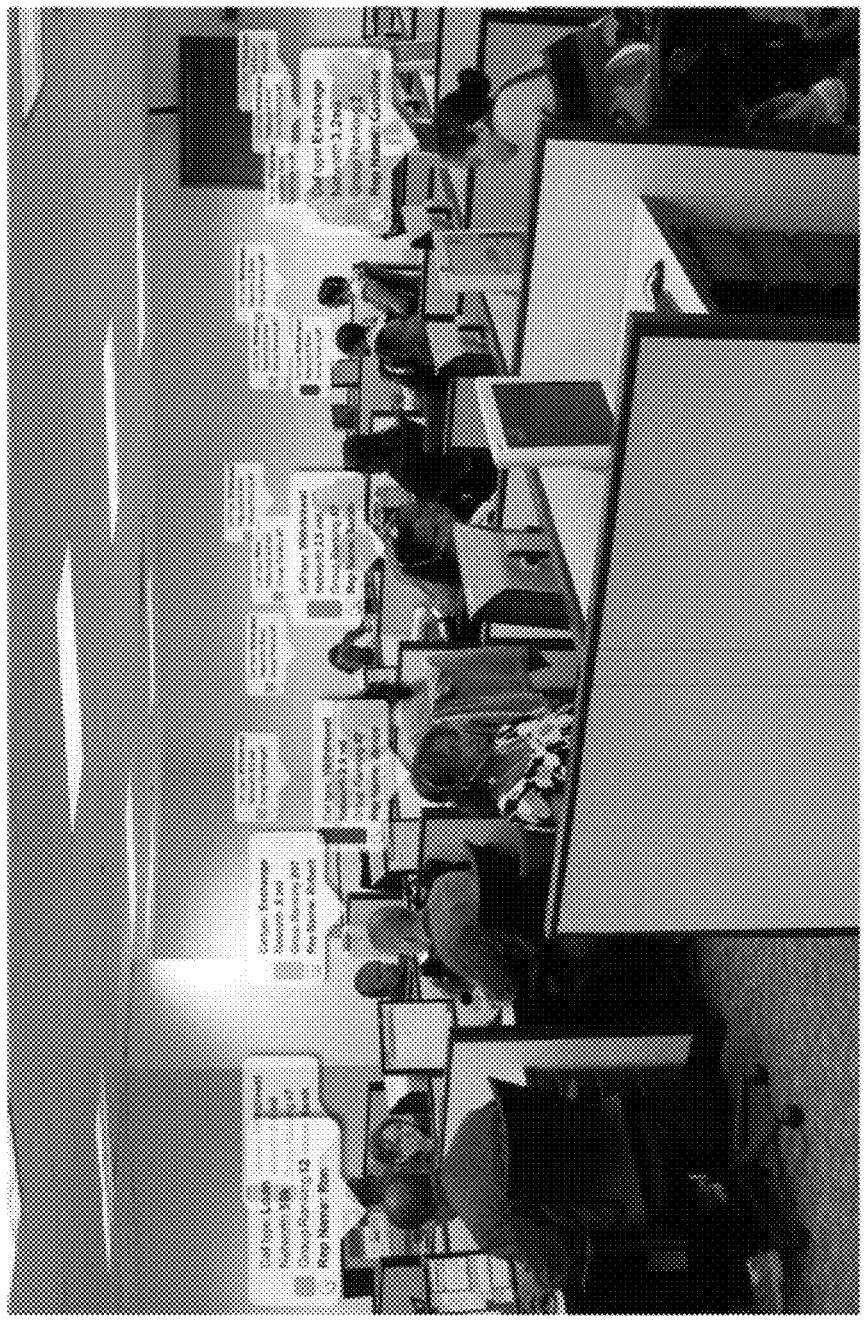
FIG. 9 is picture of an exemplary rendition of informational depictions render on a real-world view of a call center.

The X and Y coordinate data of the client systems and generated informational depictions are processed to produce a feed that when rendered on e.g., virtual reality glasses (or a portable tablet computing device) renders the generated informational depictions in juxtaposition to (either the actual view of or an image of) those client systems that are determined by the one or more computers to be in a current view of the supervisor, as illustrated by FIG. 9. The generated informational depictions are overlaid through an augmented reality system onto the real floor at the X and Y coordinates and the produced feed is projected onto virtual reality glasses or rendered by a display portion of the portable tablet computing device, and so forth.

The beacons A-D are configured to transmit signals and using conventional triangulation techniques through a receiver on the supervisor, the one or more computer systems 12a-12i determine the positional information of the receiver and hence the supervisor from the set of beacons A-D and again determine the position of the display device relative to the group of client systems. The server 12 receive this positional information from the computer system and analyze the received positional information from the computer system to determine the relative position of the display with respect to the group of client systems located in the environment to position the informational depictions from over the depicted representations of those client systems in the group of client systems in the image.

In another embodiment, the system 10 has the one or more computer systems 12a-12i further configured to receive a map of the room depicting where the client systems are located and receive a current image from the camera mounted on, e.g., the eyeglasses. The one or more computer systems 12a-12i, analyze the received image to produce positional information regarding the group of client systems in the image with respect to the received map and the current position and orientation of the supervisor.

While eyeglasses or a display device can be used other types of augmenting media devices can be configured to receive the generated image.

A block diagram of components of the system 10 is also shown. User devices can be any sort of computing device capable of taking input from a user and communicating over a network (not shown) with server and/or with other client devices. For example, user device can be a mobile device, a desktop computer, a laptop, a cell phone, a personal digital assistant ("PDA"), a server, an embedded computing system, a mobile device, as well as the eyeglasses, and so forth. User devices include monitor which render visual representations.

Server can be any of a variety of computing devices capable of receiving information, such as a server, a distributed computing system, a desktop computer, a laptop, a cell phone, a rack-mounted server, and so forth. Server may be a single server or a group of servers that are at a same location or at different locations.

Server can receive information from client device user device via interfaces. Interfaces can be any type of interface capable of receiving information over a network, such as an Ethernet interface, a wireless networking interface, a fiber-optic networking interface, a modem, and so forth. Server also includes a processor and memory. A bus system (not shown), including, for example, a data bus and a motherboard, can be used to establish and to control data communication between the components of server.

Processor may include one or more microprocessors. Generally, processor may include any appropriate processor and/or logic that is capable of receiving and storing data, and of communicating over a network (not shown). Memory can include a hard drive and a random access memory storage device, such as a dynamic random access memory, machine-readable media, or other types of non-transitory machine-readable storage devices.

Components also include storage device, which is configured to store information, map, map templates, rules data for the rules, software for the rules engine, etc.

Embodiments can be implemented in digital electronic circuitry, or in computer hardware, firmware, software, or in combinations thereof. Apparatus of the invention can be implemented in a computer program product tangibly embodied or stored in a machine-readable storage device and/or machine readable media for execution by a programmable processor; and method actions can be performed by a programmable processor executing a program of instructions to perform functions and operations of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language.

Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD_ROM disks. Any of the foregoing can be supplemented by, or incorporated in, ASICs (application-specific integrated circuits).

Other embodiments are within the scope and spirit of the description claims. For example, due to the nature of software, functions described above can be implemented using software, hardware, firmware, hardwiring, or combinations of any of these. Features implementing functions may also be physically located at various positions, including being distributed such that portions of functions are implemented at different physical locations.

What is claimed is:

1. A system comprising:
one or more computer systems, each system comprising a processor and memory with the one or more computer systems configured to:
receive from a plurality of client systems a corresponding plurality of information feeds pertaining to real-time communications between a corresponding plurality of customer service representatives and a corresponding plurality of customers;
analyze conversations derived from the information feeds;
determine the presence of conditions in the conversations;
determine, in real-time based on the analysis of the conversations and presence of conditions in the conversations in the information feeds, a status level to assign to at least some of the real-time communications between the corresponding ones of customer service representatives and customers;
generate communication status level messages that comprise the determined status levels for the at least some of the real-time communications;
generate positional information of client systems in a field of view of a display device, with the display device being embodied in a set of eyeglasses;
associate corresponding communication status level messages with corresponding ones of the client systems within the field of view; and
generate a real-world visual representation of the client systems, and a set of communication status level informational depictions corresponding to the corresponding generated communication status level messages, which when rendered on the display device in the set of eyeglasses are rendered in juxtaposition with corresponding representations of the client systems within the field of view of the display device in the set of eyeglasses according to the generated positional information.

2. The system of claim 1 wherein at least one of the information feeds comprising information specifying a physical location of the corresponding client system.

3. The system of claim 1 wherein the system is further comprises the set of eyeglasses, and the system is further configured to:
receive an image by the set of eyeglasses as the visual representation of the client systems; and
augment the image with the set of communication status level informational depictions of the generated communication status level messages in juxtaposition with the representations of the client systems in the image.

4. The system of claim 3 wherein the system is further configured to:
cause the communication status level informational depictions to be projected onto the display device in the set of eyeglasses, as pictorial representations including text information regarding the information feeds being analyzed.

5. The system of claim 1 wherein the system is further configured to:
generate the communication status level informational depictions with a color that indicates a level of severity of the communication status level informational depictions for display by the display device in the set of eyeglasses.

6. The system of claim 1, further comprising:
a portable computing system configured to:
receive the generated set of communication status level informational depictions; and
a set of eyeglasses comprising the display device configured to receive the generated set of communication status level informational depictions from the portable computing system.

7. The system of claim 3 wherein the one or more computer systems are further configured to:
generate the image and an environment containing the client systems; and
generate the communication status level informational depictions as pictorial representations depicted over corresponding client systems.

8. The system of claim 1 wherein the one or more computer systems are further configured to:
generate the communication status level informational depictions as pictorial representations of text derived from analysis of the informational feeds; and
generate positional information corresponding to the pictorial representations of the client systems in the image such that the pictorial representations are depicted over the client systems depicted in the image.

9. The system of claim 1, further comprising:
at least one image capture device, with the one or more computers, further configured to:
receive an image from the at least one image capture device to capture an image of a room with the client systems.

10. The system of claim 1 wherein the one or more computer systems are further configured to:
receive a map of an area in which the client systems are located, with the client systems having pre-determined location information that is stored;
analyze the received map to produce positional information regarding the client systems in the visual representation; and
generate the positional information for the depictions over client systems in the image in part from the stored pre-determined location information of the client systems.

11. The system of claim 1 wherein the one or more computer systems are further configured to:
receive a map of an area in which the client systems are located;
analyze the received map to produce positional information regarding the client systems in the visual representation; and
generate the communication status level informational depictions to be disposed over the representations in the visual representation of those client systems in the client systems that are contained in the visual representation at the time of generation of the visual representation.

12. The system of claim 1 further comprising:
a set of devices positioned about an area containing the client systems, the devices configured to transmit signals into the area;
a computer system configured to receive information from the set of devices; and
determine the position of the display device relative to the client systems.

13. The system of claim 12 wherein the one or more computer systems are further configured to:
receive positional information from the computer system;
analyze the received positional information from the computer system to determine the relative position of the display with respect to the client systems located in the environment; and
cause the one or more computers to position the communication status level informational depictions from over the depicted representations of those client systems in the client systems in the visual representation.

14. A computer program product tangibly stored on a computer readable storage device, the computer program product comprising instructions to cause a processor to:
receive from a plurality of client systems a corresponding plurality of information feeds pertaining to real-time communications between a corresponding plurality of customer service representatives and a corresponding plurality of customers;
analyze conversations derived from the information feeds;
determine the presence of conditions in the conversations;
determine, in real-time based on the analysis of the conversations and presence of conditions in the conversations in the information feeds, a status level to assign to at least some of the real-time communications between the corresponding ones of customer service representatives and customers;
generate communication status level messages that comprise the determined status levels for the at least some of the real-time communications;
generate positional information of client systems in a field of view of a display device, with the display device being embodied in a set of eyeglasses;
associate corresponding communication status level messages with corresponding ones of the client systems within the field of view; and
generate a real-world visual representation of the client systems and a set of communication status level informational depictions corresponding to the corresponding generated communication status level messages, which when rendered on the display device in the set of eyeglasses are rendered in juxtaposition with corresponding representations of the client systems within the field of view of the display device in the set of eyeglasses according to the generated positional information.

15. The computer program product of claim 14 wherein at least one of the information feeds includes information specifying a physical location of the client systems; and the instructions to generate the real-world visual representation, further comprises instructions to:
apply the information specifying a physical location, to determine the juxtaposition of the communication status level informational depictions with respect to the representations of the client systems.

16. The computer program product of claim 14 further comprising instructions to:
receive an image depicting the representations of the client systems; and
augment the image with the set of communication status level informational depictions of the generated messages in juxtaposition with corresponding ones of the representations of the client systems in the image.

17. The computer program product of claim 14 further comprising instructions to:
cause the communication status level informational depictions to be projected onto the display device in the set of eyeglasses, as pictorial representations including text information regarding the information feeds being analyzed.

18. The computer program product of claim 14 further comprising instructions to:
generate the representations of the client systems; and
cause the communication status level informational depictions to be projected onto a set of eyeglasses comprising a display device configured to receive the communication status level informational depictions and the generated representation of the client systems.

19. The computer program product of claim 14 further comprising instructions to:
generate an image an environment containing the client systems as the visual representation; and
generate the communication status level informational depictions as pictorial representations depicted over corresponding client systems.

20. The computer program product of claim 14 further comprising instructions to:
generate positional information corresponding to the pictorial representations of the client systems in the visual representation such that the informational depictions are depicted over the client systems depicted in the visual representation.

21. The computer program product of claim 14 further comprising instructions to:
receive a map of an area in which the client systems are located; and
analyze the received visual representation to produce positional information regarding the client systems in the visual representation.

22. The computer program product of claim 14 further comprising instructions to:
receive a map of an area in which the client systems are located;
analyze the received map to produce positional information regarding the client systems; and
generate the informational depictions to be disposed over the representations in the visual representation of those client systems in the client systems that are contained in the map at the time of generation of an image.

23. A method comprising:
receiving from a plurality of client systems, a corresponding plurality of information feeds pertaining to real-time communications between a corresponding plurality of customer service representatives and a corresponding plurality of customers, with the plurality of information feeds received from a corresponding plurality of client systems that are associated with the customer service representatives and are in defined locations;
analyzing by the one or more computers, conversations derived from the information feeds;
determining by the one or more computers, from the conversations the presence of conditions;

determining, by the one or more computers, in real-time based on the analysis of the conversations and presence of conditions in the conversations in the information feeds, a status level to assign to at least some of the real-time communications between the corresponding ones of customer service representatives and customers;

generating by the one or more computer systems communication status level messages that comprise the determined status levels for the at least some of the real-time communications;

generating by the one or more computer systems positional information of client systems in a field of view of a display device, with the display device being embodied in a set of eyeglasses, with the generated positional information based in part on the defined locations of the client systems associated with customer service representatives;

associating by the one or more computer systems corresponding communication status level messages with corresponding ones of the client systems within the field of view; and generating by the one or more computer systems a real-world visual representation of the client systems and a set of communication status level informational depictions corresponding to the corresponding generated communication status level messages, which when rendered on the display device in the set of eyeglasses are rendered in juxtaposition with corresponding representations of the client systems within the field of view of the display device in the set of eyeglasses according to the generated positional information.

24. The method of claim 23 wherein at least one of the information feeds comprising information specifying a physical location of the client systems to provide the defined locations information.

25. The method of claim 23 further comprising:
generating an image as the representation of the client systems, the image augmented with the set of communication status level informational depictions of the generated communication status level messages in juxtaposition with the representations of the client systems in the image.

26. The method of claim 23 further comprising:
causing the communication status level informational depictions to be projected onto the display device in the set of eyeglasses, as pictorial representations including text information regarding the information feeds being analyzed.

27. The method of claim 23 further comprising:
generating the representations of the client systems; and
causing the communication status level informational depictions to be projected onto a set of eyeglasses comprising a display device configured to receive the communication status level informational depictions and the generated representation of the client systems.

28. The method of claim 23 further comprising:
generating an image of an environment containing the client systems as the visual representation; and
generating the communication status level informational depictions as pictorial representations are depicted in the image over corresponding client systems.

29. The method of claim 23 further comprising:
generating pictorial representations; and
determining positional information in an image such that the pictorial representations are depicted over the client systems depicted in the image.

30. The method of claim 23 further comprising:
receiving a map of an area in which the client systems are located; and
analyzing the visual representation to produce positional information regarding the client systems in the visual representation.

31. The method of claim 23 further comprising:
receiving a map of an area in which the client systems are located;
analyzing the received map to produce positional information regarding the client systems in the visual representation; and
generating the communication status level informational depictions to be disposed over the representations in the visual representation of those client systems in the client systems that are contained in the visual representation.

* * * * *